March 30, 1965  E. NEEMAN  3,176,285
DEVICE FOR DETECTING FAULTS IN HIGH TENSION LINE INSULATORS
Filed July 31, 1962
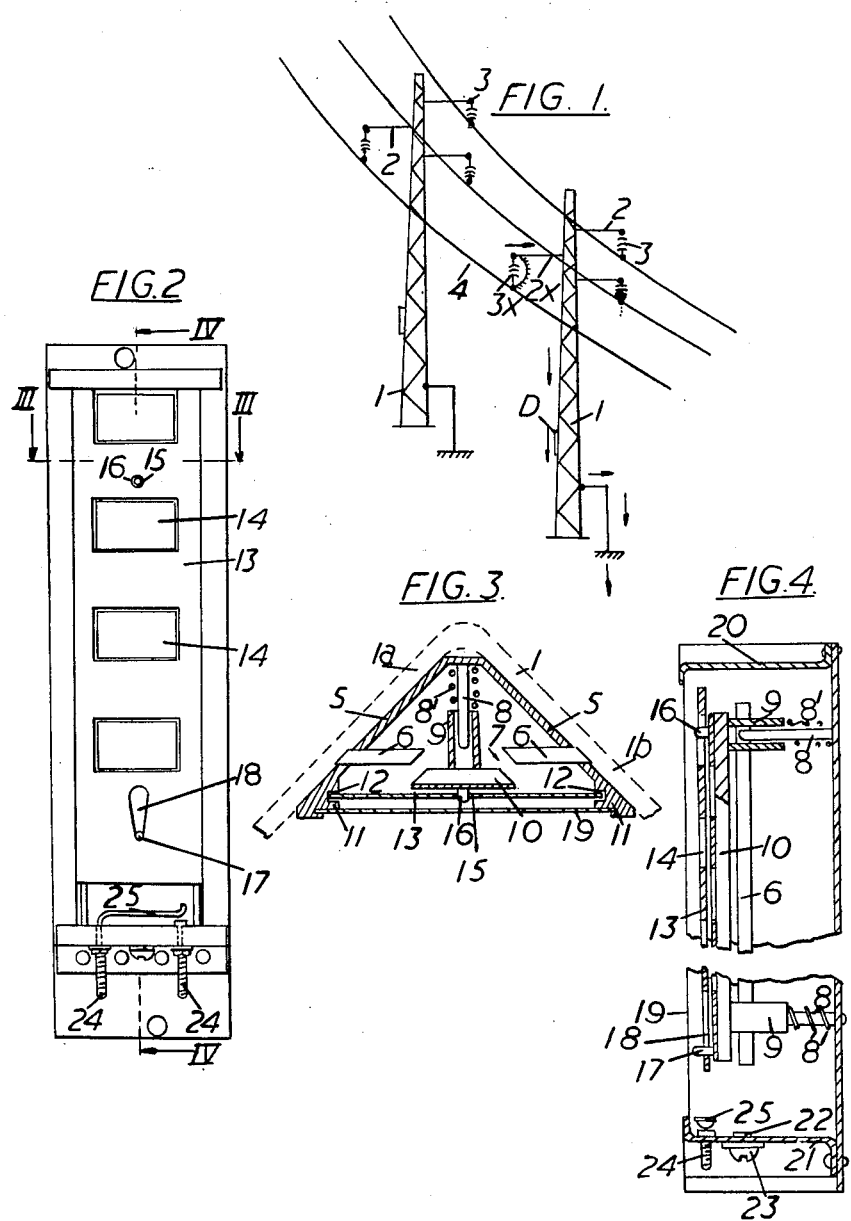
Inventor
ELIEZER NEEMAN
By
Attorneys

United States Patent Office 3,176,285
Patented Mar. 30, 1965

3,176,285
DEVICE FOR DETECTING FAULTS IN HIGH
TENSION LINE INSULATORS
Eliezer Neeman, 46 Aliyah St., Bath-Galim,
Haifa, Israel
Filed July 31, 1962, Ser. No. 213,635
5 Claims. (Cl. 340—255)

From practice it is known that a certain percentage of insulators (or insulator strings) employed in high voltage overhead lines develop a gradual deterioration of their insulation properties.

The phenomenon of gradual deterioration results mostly from an internal production fault which could not be detected.

According to standards, insulators should withstand at least 2.5–3.5 times the service voltage.

Insulators which have deteriorated, with time, to an insulation level below the said standards, constitute one of the main causes for the interruption in the supply of electric energy. Instantaneous over-voltage or foggy weather conditions may cause momentary breakdown of the affected insulators, and thus a phase to ground short-circuit (and consequently to tripping of the affected line).

After disconnecting the faulty line and extinguishing the arc which has struck due to the said fault in the insulator, the insulator may again appear intact exteriorly and no fault might be noticeable at its outside. Thus the detection of such a faulty insulator is not a simple matter. The methods of detection employed till now are based mainly on visual inspection by means of binoculars, or the method of electric field measuring across each individual insulator by means of a special electrometer. These methods are rather costly, since the amount of work in searching for a faulty insulator is quite considerable, and the readings of the electrometer are influenced by many unknown factors, such as e.g. moisture and dirt. In this respect the device to be described here fills a noticeable gap. It indicates at a glance pylons which carry deteriorated insulators, in a clear and unambiguous manner, and without loss of time.

Generally therefore it is the object of this invention to provide a device which indicates the presence of a fault in one or more of the insulators in an overhead high voltage line.

More particularly it is the object of the invention to provide a device which permits the detection of the fault without use of costly instruments and which itself is inexpensive enough to be fixed to every pylon or mast of the line.

According to the invention the new device comprises a non-magnetic casing designed to be attached to or fitted on a metallic pylon or the grounding of a non-ferrous mast, two ferrous strips being arranged oppositely to one another in the said casing and being magnetically coupled with the pylon or a short section in contact with the grounding wire, a ferrous body serving as an armature being disposed in such a manner that it can be attracted by the strips when these latter become energised, the said ferrous body being normally held at a distance from the said ferrous strips, a member, covering the said ferrous body, being held normally by the said ferrous body in an initial position and adapted to be released and slide downwards whenever the said ferrous body is attracted by the strips, the ferrous body and its covering member being preferably disposed behind a transparent wall of the housing, the downward dislocation of the covering body resulting in a visible signal.

These and further features of the invention will become clear from the following description which refers to the annexed drawing. In the drawing one executional form of the new device has been shown in a schematical way.

In the drawings FIGURE 1 illustrates the location of the new device on a power line. FIGURE 2 is an elevational frontal view of the new device. FIGURE 3 is a section on line III—III of FIGURE 2, and FIGURE 4—finally—is a section on line IV—IV of FIGURE 2.

In FIGURE 1 there is seen a fraction of a power line comprising two pylons 1 built up in a conventional manner from angle sections. From the pylons jut out arms 2 from which are suspended ceramic or glass insulators 3 of a known kind which carry the current conducting wires. Should one of the said deteriorated insulators develop a breakdown as a result of the above-mentioned conditions, say the insulator marked 3x, then an arc will come into existence extending from the wire 4 to the arm 2x, or current will flow across the insulator, (i.e. an arc will develop). The wire suspended from insulator 3x and the arm 2x will be electrically bridged by means of the arc, and the current will flow, as indicated by arrows, from the said arm into the pylon and down to earth through the angle sections. In the case of concrete or wooden masts or poles, the latter will be earthed and the flow of current will follow the grounding wire which connects the insulator supports with a grounding plate placed in earth near the said pylon.

When the short circuit current travels along the pylon it is divided and passes through the four vertical angle sections forming the main uprights of the pylon and thereby in each of them a circumferential magnetic field is formed. The power lines extend partly in the flanges of the section and partly in the space defined between these latter e.g. in the flanges 1a, 1b, of the section 1, shown in FIGURE 3. The existence of this field in the air space between the flanges of the section is made use of for operating a visual signal and for closing an electrical circuit. Where the new device D is mounted on every pylon, an inspecting patrol passing along the line will immediately detect those pylons which carry faulty insulators.

Turning now to FIGURES 2–4 the new device comprises two side walls 5 united at one of their longitudinal edges and at right angles with one another. They may be constituted by the flanges of an angle section. This section is made of non-magnetic material. It may be metal, say brass or aluminum, but it may be plastic material as well. In the two walls 5 are fixed two ferrous longitudinal strips 6 which extend through the walls from the outside into the space between the two walls 5. Between the inner edges of the two strips 6 there remains an air gap 7. At the juncture of the two walls 5 there are provided near the upper and lower ends of strips 6 two pins 8 which extend inwardly into the angle formed by the two walls 5. Onto each of the pins 8 is fitted loosely a sleeve 9 which is urged forwardly by a spring 8' on pin 8. To the forward end of the two sleeves 9 is fixed an elongated plate 10 of iron. As can be seen in FIGURE 3 the plate 10 is positioned opposite the gap 7 on the two strips 6. The longitudinal, vertical edges of the strips 6 are cut obliquely and so are the two opposite longitudinal eadges of plate 10, but in opposite direction. Near the forward edges of the two walls 5 there are provided two oppositely disposed parallel, co-planar ribs 11, into each of which is cut a groove 12. In the groove 12 can slide up and down a thin, non-magnetic opaque indicator plate 13 which, over its whole extension has windows 14, uniformly spaced from one another. Indicator plate 13 is juxtapositioned with respect to plate 10. In the upper part of plate 13 there is provided a small hole 15. On the plate 10 is provided a latching element in the form of a pin or stud 16 which can enter the hole 15. Vertically below stud 16 there is provided on plate 10, near its lower end, a limiting element in the form of a pin 17 which is somewhat longer than stud 16. The pin 17 enters an elongated hole 18 near the lower edge of plate 13. The front wall of the casing formed by the two walls 5 is constituted by a transparent pane 19. A top 20 and a bottom 21 are attached to walls 5. The bottom 21 has a hole 22 which can be closed by a short screw 23. Into bottom 21 are fitted two terminals 24, electrically insulated from the said bottom. To one of the terminals 24 is fixedly attached a bendable elastic contact piece 25 which extends to a point slightly above the opposite terminal 24.

The plate 10 is painted in two colours in "zebra-like manner," the height of the horizontal stripes being equal to the distance between adjacent windows 14 on plate 13 and to the height of each window or cutout. Plate 13 is painted in one of the two colours appearing on plate 10.

The new device functions as follows:

With plate 13 suspended on stud 16 the cutouts or windows 14 are in register with the stripes on plate 10 which are of the same colour as plate 13. The spring 8' urge the plate 10 forwardly, i.e. hold it at a distance from the two strips 6. Supposing now that the new device is fitted into the angle of one of the angle-sections forming the vertical members of the pylon or mast as shown in FIGURE 3, the outside vertical faces of strips 6 are in magnetic contact with the steel of the pylon, and thus form a low reluctance magnetic path with the pylon. As has been explained above, in the event that an insulator breaks down, a short circuit current flows in all the sections constituting the pylon. Consequently the magnetic field which comes into existence and in which the strips 6 are situated, will energise these latter turning them into magnetic poles. As a consequence plate 10, being an armature, will be attracted to the poles 6 against the bias of springs 8'. As a result the stud 16 will be pulled out of hole 15 so that the plate or shutter 13 will slide down in the groove 12. Its downward movement is limited by the upper end of hole 18 which is stil in engagement with pin 17. Due to the downward movement of shutter 13 the stripes on plate 10 contrasting in colour with that of shutter 13 will appear in the windows 14 and in this way a visual signal is given. This can easily be observed, even from a distance, through the transparent pane 19.

Additionally, if—for instance—the pane is covered by dirt or dust the falling shutter 13 presses on the flexible contact piece 25 so that it bridges the gap between the two terminals 20. Thus by means of a test lamp or flashlight with battery which can specially be fitted for such purposes, it can be ascertained that there is contact between the two terminals 24 which can be due only to the fact that the shutter 13 has fallen down. The device may be fixed to a pylon in any known way. Preferably it will be clamped thereto by two shackles, or screwed thereon so that the outside faces of the strips 6 are in intimate contact with the steel parts of the pylon.

When the new device has indicated a fault and this has been corrected the device can easily be set again by removing screw 23 and pushing up the shutter 13 by means of a pin, screwdriver, nail or the like until hole 15 again engages stud 16.

In the above example the new device is provided with a casing of triangular cross section. This form has been chosen because it fits well into an angle section of which pylons are usually constructed. However, it would be within the scope of the invention to provide a casing of different shape.

Whenever earthed wooden poles are used, an additional piece of iron section has to be attached to the poles, in contact with the grounding wire, so that the latter passes along the apex of the section, and then a device according to the invention is fitted into the said section.

I claim:

1. A device attachable to a pylon for detecting faulty insulators which cause short circuits in high tension lines carried thereby, comprising, a non-magnetic casing attachable to the pylon, a pair of spaced ferrous strips positionable adjacent to a metallic element of the pylon to form a low reluctance magnetic path with said metallic element; an air gap between said ferrous strips in said casing, an armature plate having a portion of ferrous material disposed in said air gap, an indicator plate juxtapositioned with respect to said armature plate and slidable by gravity from an upper non-indicating position to a lower indicating position, and a latching element carried by said armature plate and normally retaining said indicator plate in the upper non-indicating position, whereby when a fault occurs in the insulators of the pylon, a magnetic field is created sufficient to cause said ferrous strips to move said armature to release said latching element, permitting said indicator plate to move downwardly by gravity to its indicating position.

2. A device as defined in claim 1, wherein said indicator plate is formed with at least one window, said armature plate being disposed behind said indicator plate and exposing a contrasting surface thereof through said window when the indicator plate is released to its lower indicating position.

3. A device as defined in claim 1, wherein the armature latching element includes a pin carried by the ferrous portion of the armature disposed in the air gap defined by the ferrous strips, said pin being receivable in an opening in said indicator plate, said latching element being biased in latching position by a spring and being actuated to release said indicator plate by the magnetic field in said air gap.

4. A device as defined in claim 1, further including an electrical contact disposed below the indicator plate, said contact adapted to be actuated to close an electrical circuit when the indicator plate is released and falls by gravity to its indicating position.

5. A device as defined in claim 1, wherein said casing is of triangular cross section and includes a transparent window at the front side thereof, the sides of the casing including a pair of grooves slidably receiving said indicator plate.

References Cited in the file of this patent

UNITED STATES PATENTS

| | | |
|---|---|---|
| 2,138,430 | Rudd | Nov. 29, 1938 |
| 2,444,476 | Stearn | July 6, 1948 |
| 2,651,030 | Gardner | Sept. 1, 1953 |
| 3,083,359 | Smith | Mar. 26, 1963 |